Figure 1:
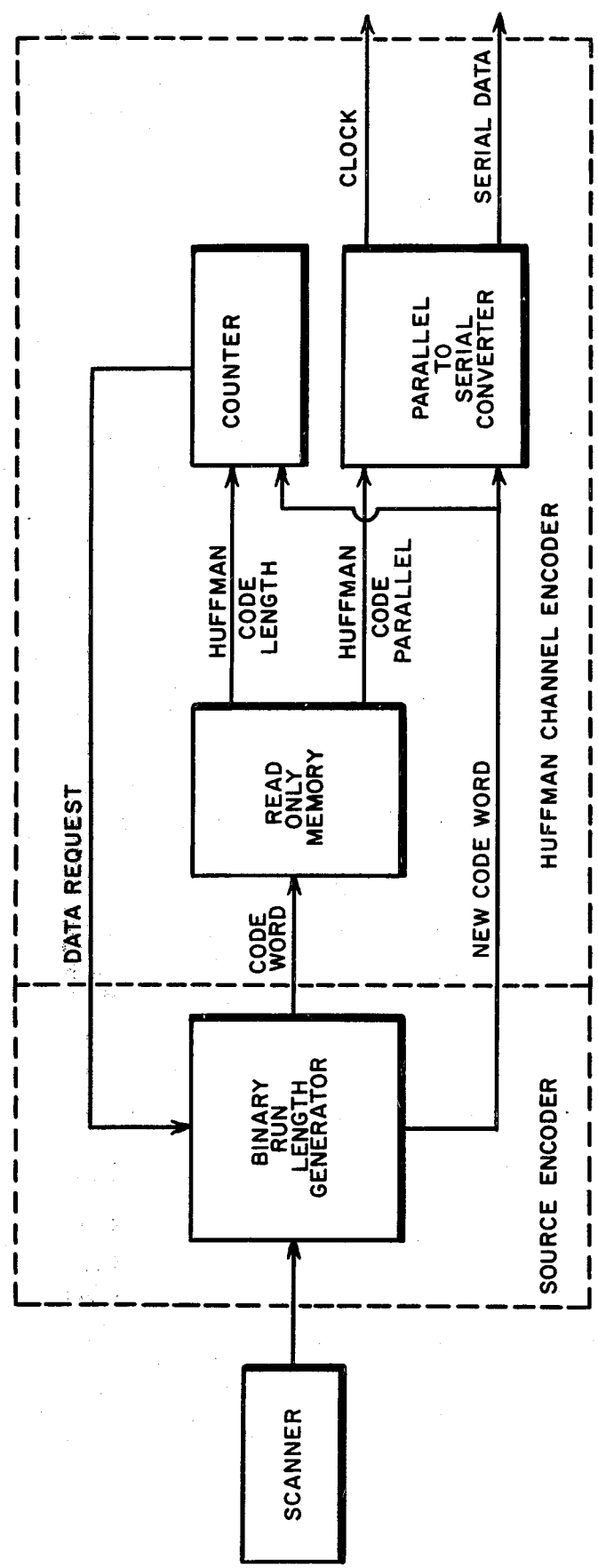

United States Patent [19]

Spencer et al.

[11] 4,161,757
[45] Jul. 17, 1979

[54] FACSIMILE SYSTEM

[75] Inventors: David R. Spencer, Melville, N.Y.;
Larry K. Baxter, Lexington, Mass.

[73] Assignee: Litton Systems, Inc., Melville, N.Y.

[21] Appl. No.: 802,344

[22] Filed: Jun. 1, 1977

[51] Int. Cl.² .......................... H04L 3/00; H04N 1/00
[52] U.S. Cl. ............................ 358/261; 340/347 DD
[58] Field of Search .............................. 358/260, 261; 340/347 DD

[56] References Cited

U.S. PATENT DOCUMENTS 3,717,851 2/1973 Cocke ......................... 340/347 DD
3,925,780 12/1975 Van Voorhis ............... 340/347 DD

OTHER PUBLICATIONS

*IBM Technical Disclosure Bulletin*, vol. 15, No. 4, Sep. 1972, pp. 1109–1110, "Code Translation Using Multiple Associative Memory Searches".

Primary Examiner—Howard W. Britton
Attorney, Agent, or Firm—Robert F. Rotella

[57] ABSTRACT

A facsimile system comprising transmitting means for scanning a document and encoding the scanned data into run lengths and subsequent Huffman codes and transmitting the scanned data; and receiver means for receiving the transmitted encoded data, decoding same into the original data format and recording such data, the receiving means including decoder means having a read only memory for receiving serial data from the transmitter means to partially address the read only memory with the incoming data bit and a memory buffer register for supplying the read only memory with a vectored address from the read only memory to complete the address of the read only memory, the vectored address having been supplied to the memory buffer register from the read only memory when the previous data bit was received, the vectored address comprising the decoded loop.

4 Claims, 2 Drawing Figures

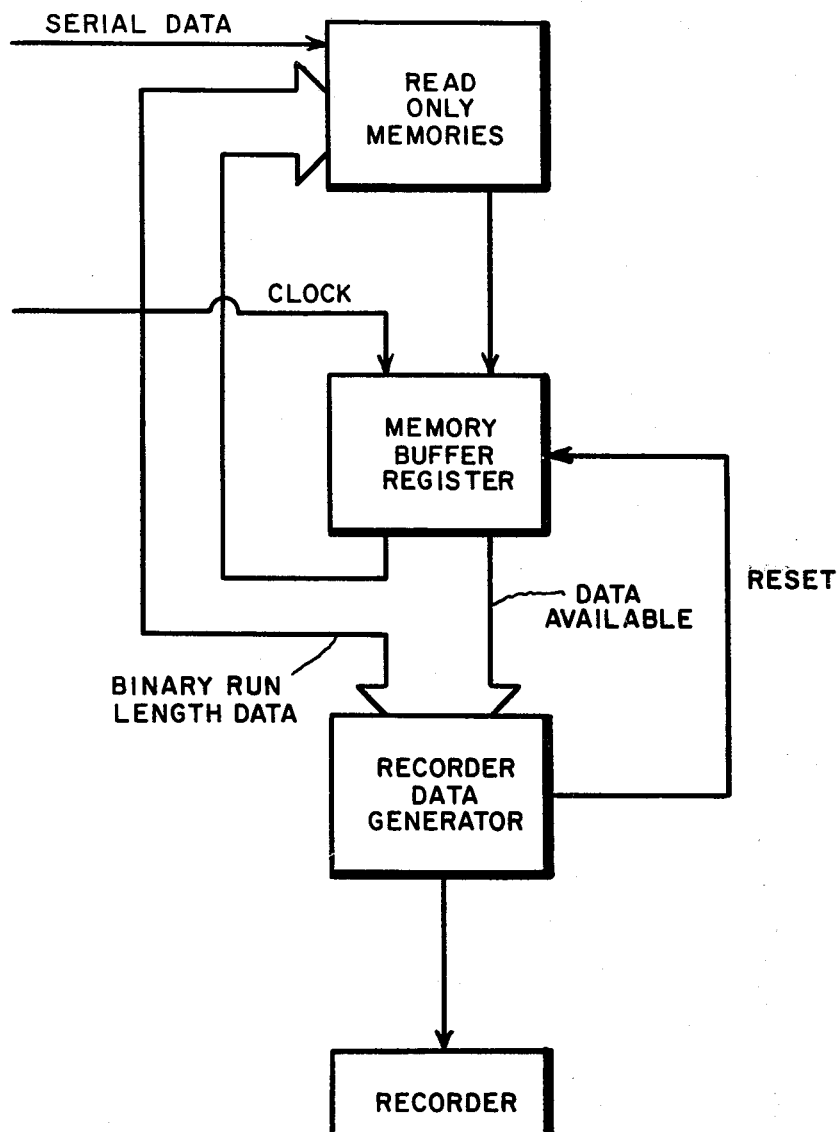
Fig_2

FACSIMILE SYSTEM

The present invention relates to facsimile systems.

It is advantageous to shorten the average code word length in a facsimile system. By utilizing a Huffman code in a Gray scale, binary codes that occur frequently may be assigned short words from a variable length code set and infrequently occuring binary codes may be assigned longer words. The average number of bits per transmitted code word can thus be reduced:

A major deficiency in the utilization of Huffman code set is that for a set of 128 individual codes varying in length from 1 to 12 bits conventional technology for decoding the Huffman codes would require a memory having 4000 locations, and this is economically undesirable.

It is accordingly and object of the present invention to permit utilization of a Huffman code in such a situation while limiting the number of memory locations to reasonable limits (256 for example).

Other objects and advantages of the present invention will become apparent from the following specification and the drawings wherein:

FIG. 1 is a schematic diagram of the facsimile transmitter of the facsimile system made in accordance with the teachings of the present invention, and FIG. 2 is a schematic diagram of the facsimile receiver of the facsimile system made in accordance with the teachings of the present invention.

The facsimile system includes a transmitter which has a scanner for scanning a document. The scanned data is supplied to a binary run length generator and a conventional Huffman encoder which includes a read only memory, a counter and a parallel to serial converter. The variable length encoding is performed in the read only memories by a straight look-up procedure.

Encoded data is transmitted via a communication channel to a set of decoding read only memories which are utilized in conjunction with a memory of buffer register. The read only memories are addressed by vector feedback from the memory buffer register and are indexed by the incoming data bit. Each memory location consists of a vector that points to the next state to be addressed. A memory output bit is used to flag whether a variable length code has been compiled and additional bits provide the binary data associated with the variable length code. The memory vectors are generated from the sequence map used in generating the Huffman Code.

WHAT IS CLAIMED IS:

1. A facsimile system comprising transmitting means for scanning a document and encoding the scanned data into run lengths and subsequent Huffman codes and transmitting the scanned data; and receiver means for receiving the transmitted encoded data, decoding same into the original data format and recording such data, said receiving means including decoder means having a read only memory for receiving serial data from said transmitter means to partially address the read only memory with the incoming data bit and a memory buffer register for supplying said read only memory with a vectored address from said read only memory to complete the address of the read only memory, said vectored address having been supplied to the memory buffer register from the read only memory when the previous data bit was received, said vectored address comprising the decoded loop.

2. A system for decoding a comma free code, such as a Huffman code, comprising:
   read only memory means for receiving serial data to partially address the read only memory with the incoming data bit and a memory buffer register for supplying said read only memory with a vectored address from said memory to complete the address of the read only memory, said vectored address having been supplied to the memory buffer register from the read only memory when the previous data bit was received, said vectored address comprising the decoded loop.

3. A facsimile transmitting system, comprising:
   a scanner for scanning a document, a binary run length generator for compressing the scanned data into binary code words, each word representing the number of contiguous black or white scanned data elements, a read only memory for converting the binary code words into a variable length code word, a counter preset by said memory to the length of said variable length code word, said counter used to request binary code words from the binary run length generator upon completion of the transmission of said variable length code word, and a parallel-to-serial converter for converting the variable length code word into a serial format.

4. A facsimile receiving system for receiving variable encoded data from a transmitter, comprising:
   a read only memory, a memory buffer register for storing the output of said memory, said memory being addressable by a memory address comprising first and second parts, said first part being serial input data from the transmitter and said second part being an address stored in said memory, the output of said memory comprising the variable length code decoded into a binary run length code whenever a memory location is addressed corresponding to the received variable length word or the stored address when the addressed memory location does not correspond to the received variable length word.

* * * * *